Jan. 16, 1934.    R. W. RICHARDSON    1,943,345
RECOVERY OF AMMONIA FROM COOK LIQUOR
Filed April 16, 1931
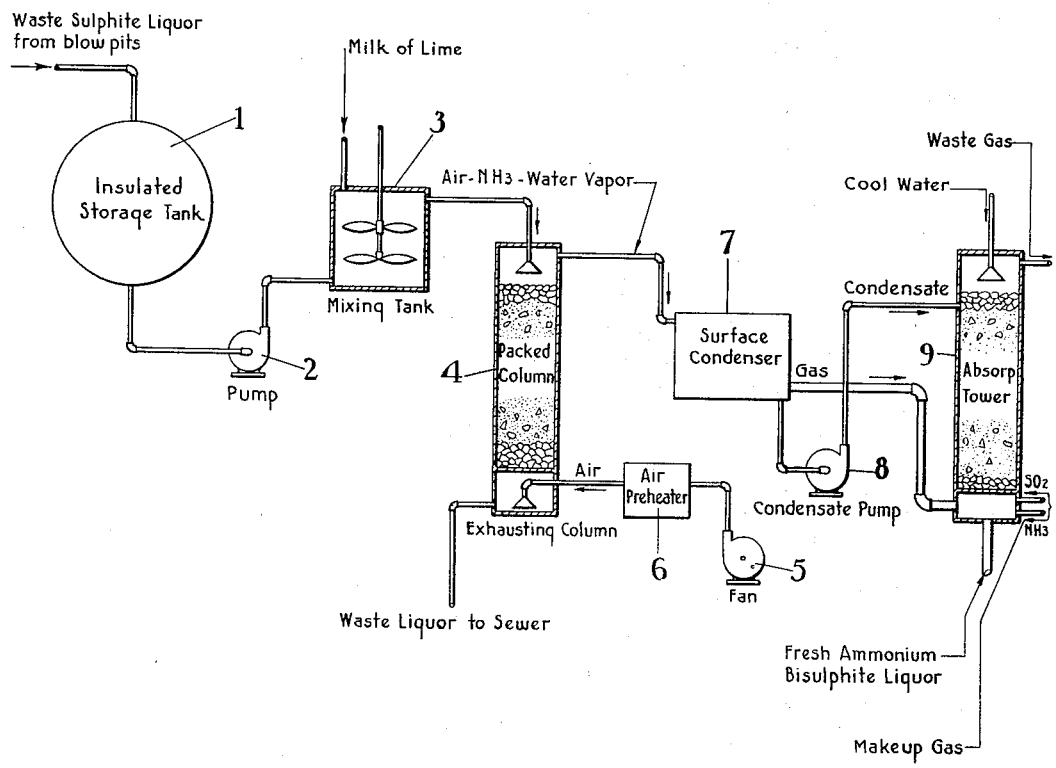
INVENTOR
ROGER W. RICHARDSON.
BY HIS ATTORNEY Patented Jan. 16, 1934

1,943,345

UNITED STATES PATENT OFFICE 1,943,345

RECOVERY OF AMMONIA FROM COOK LIQUOR

Roger W. Richardson, Wilmington, Del., assignor to E. I. du Pont de Nemours & Company, Wilmington, Del., a corporation of Delaware Application April 16, 1931. Serial No. 530,640

2 Claims. (Cl. 23—193)

This invention relates to a process for the recovery and reutilization of ammonia from wood pulp cook liquors and particularly from such liquors containing ammonium bisulfite or ammonium sulfite.

In the preparation of wood pulp by the ammonium bisulfite process and like processes utilizing ammonia-containing liquors it is desirable, in order to conduct the process economically, to recover a large proportion of the ammonia used. There is, however, a relatively small quantity of ammonia in cook liquors of the type usually encountered. This concentration is as a rule below 0.5% of ammonia on the basis of the weight of the liquor, and if the liquor is made alkaline with lime, and the resulting mixture distilled for ammonia recovery, according to any of the ordinary distillation processes, a large quantity of heat (in the form of steam) is required per unit of ammonia recovered.

With a view to eliminating this and other difficulties in the recovery of ammonia from cook liquors, obtained in the ammonium bisulfite or ammonium sulfite pulping process or modifications thereof, it is an object of the present invention to provide an improved process for the recovery and reutilization of ammonia from such liquors. Another object of the invention is to utilize the sensible heat of the cook liquor to effect the recovery of the ammonia.

Other objects and advantages of the invention will be apparent as it is better understood by reference to the following specification and to the accompanying diagrammatic flow sheet.

The method which I have found exceptionally economical comprises essentially a modified distillation process which requires a relatively small quantity of heat to exhaust or drive out the ammonia. Furthermore, in carrying out my process the sensible heat of the cook liquors as discharged from the digesters is used to supply all or nearly all of the heat necessary for the recovery. This recovery process can be used in combination with the ordinary type of sulphite mill acid absorption equipment, and the ammonia absorbed to form fresh ammonium bisulphite cook liquors by adding the necessary "make-up" ammonia to the cycle. However, the recovery system is not necessarily dependent upon being fitted into the ordinary cycle of a sulphite pulp mill; it may be operated independently and the ammonia absorbed in various other ways if desired.

The accompanying diagrammatic flow sheet will make the details of the recovery process clear. Referring to the drawing, the waste sulphite liquor immediately upon being discharged from the digester, or the digester blow-pit, not shown, is pumped to an insulated storage tank (1). With proper equipment and care in conserving the heat, the liquor has a temperature of from 85° to 95° C. upon reaching the tank. From here it is forced by the pump (2) into the mixing tank (3) wherein it is limed or otherwise made alkaline, and still at the relatively high temperature passes on to the exhausting column (4), which may be either a plate distilling column, or a packed tower (packed with Raschig rings, for example). It is advisable that this column be well lagged, since heat conservation is an important part of the process. Instead of running the column (4) as a straight distilling column, air or other inert gas (which may be heated or not, as desired) is forced up the tower counter-current to the hot liquor. The inert gas is supplied to the base of column (4) by the fan (5) after passing, if desired, through the preheater (6). The sensible heat of the liquor is sufficient to drive off most of the ammonia under these conditions; in some cases to recover the last traces of ammonia it may be necessary to add heat to the exhausting column. Steam coils, not shown, may be provided for this purpose, or steam may be forced directly into the column or the heat supplied by any other suitable means. The exhausted liquor is discharged to waste from the bottom of the column. The mixture of hot gases (inert gas, water vapor, $NH_3$) leaving the top of the column is passed through a cooler, such as the surface condenser (7), which cools the mixture to about 25° C. This causes a large part of the water vapor to condense. The condensed water vapor contains some ammonia, and to assure its recovery the condensate from the cooler is forced by pump (8) to the absorption tower (9) and introduced at some point well up the column, but not too near the top as by such an installation some of the ammonia may be lost to the waste gases. The cooled gases pass into the base of the $SO_2$ absorption tower, which may be of the conventional type used in this industry, at about the same point as the $SO_2$ from the sulphur burners or any other convenient point, and the make-up ammonia (in that quantity required to make the solution up to the desired ammonium strength; that is, to replace the process losses of ammonia) from anhydrous ammonia storage either as the vaporized gas or sprayed into the tower as liquid ammonia. If the make-up be aqueous ammonia, it may be introduced at the same point as the cooler condensate or at some other convenient point in the tower. The usual practice of passing cool water into the top of the tower and causing it to flow counter-current to the make-up gas may be employed. The fresh ammonium bisulfite liquor, containing the reclaimed ammonia, leaves the bottom of the tower ready for use in the digester. It should be noted that the $SO_2$ absorption tower may be part of the regular sulfite mill equipment,—no new or additional absorption equipment being required for my recovery process. The economies of operation afforded by my process, therefore, are self-evident.

It should be noted that it is not necessary to run my process in combination with the regular acid absorption system. If desired, a separate absorption tower may be used, and the absorption carried out in any practicable way; for example, by introducing sufficient $SO_2$ to neutralize the ammonia and absorbing the resulting compound with cold water. If an absorption system separate from the regulation $SO_2$ towers were used, the cooler could be dispensed with and the base of the absorption tower used as a cooling chamber.

From a consideration of the above specification it will be realized that any process involving the recovery of ammonia from cook liquors will come within the scope of this invention if the process includes the use of air or other inert gas in the exhausting column to facilitate the removal of ammonia, the utilization of the sensible heat of the discharged cook liquors as the source of a substantial part of the heat necessary to exhaust the ammonia, or the fitting in of my recovery process with the usual sulphite acid absorption system to prepare fresh ammonium sulphite liquor.

I claim:

1. In a process for the recovery of ammonia from the cook liquor in the manufacture of paper pulp by the ammonium bisulfite process the step which comprises making the hot cook liquor alkaline and recovering the ammonia it contains by bringing it, while still hot, into intimate contact with air, cooling the resulting gas, and absorbing in the thus condensed liquid part of the condensable ammonia, the remaining uncondensed ammonia being recovered by subsequently scrubbing the uncondensed gas free of ammonia.

2. In a process for the recovery and reutilization of the ammonia in used cook liquor in the manufacture of paper pulp, the step which comprises alkalizing the hot cook liquor, passing the resulting alkaline liquor counter current to an inert gas, cooling and thereby condensing ammonia from the resulting gaseous mixture, introducing said condensed ammonia together with make up water toward the top of an absorption tower, passing uncondensed gases from the cooling operation counter current to the flow of said condensed ammonia and make up water.

ROGER W. RICHARDSON.